April 6, 1965 H. J. SCHWERDHÖFER 3,176,545
MULTIPLE SPEED BICYCLE HUB

Filed April 20, 1962 2 Sheets-Sheet 1

INVENTOR
Hans Joachim Schwerdhöfer

INVENTOR
Hans Joachim Schwerdhöfer

United States Patent Office 3,176,545
Patented Apr. 6, 1965

3,176,545
MULTIPLE SPEED BICYCLE HUB
Hans Joachim Schwerdhöfer, Schweinfurt am Main, Germany, assignor to Fichtel & Sachs A.G., Schweinfurt am Main, Germany, a corporation of Germany
Filed Apr. 20, 1962, Ser. No. 189,208
Claims priority, application Germany, Apr. 21, 1961, F 33,732
9 Claims. (Cl. 74—750)

This invention relates to multiple speed hubs for bicycles and the like, and more particularly to a bicycle hub capable of being switched between the several speeds thereof by backward movement of the pedals.

Bicycle hubs in which speed changes are effected by back-pedaling have the advantage of not requiring external control cables and manual control elements, but multiple-speed hubs of this type, unless equipped with a coaster brake, have the disadvantage that the backward pedaling movement is not limited. While backward pedaling through a predetermined arc of pedal movement and the corresponding rotation of a driver member in the hub cause change from a first to a second speed or transmission ratio in the hub gearing, further back-pedaling may change the speed ratio back to the original value or to a third value depending on the number of speeds available. There is nothing to stop the reverse pedal movement when the desired speed change is effected.

The object of this invention is the provision of a multiple-speed bicycle hub of the type referred to in which back-pedaling is limited to the arc necessary for a single speed change.

With these and other objects in view, the invention in its more specific aspects relates to a multiple-speed hub for bicycles and other pedal-operated vehicles in which a hub shell and a driver member are rotatable about a common axis, and the pedals or similar actuating means are provided for selectively rotating the driver member about its axis in a forward or backward direction.

A variable speed transmission is interposed between the hub shell and the driver member. It includes rotatable input and output means, and a speed changing member which is movable between a plurality of positions for varying the speed ratio of the input and output means. The input means is connected to the driver member so that the transmission as a whole rotates with the driver member. The output means is connected to the hub shell in such a manner that the hub shell rotates with the driver member during forward rotation of the latter only. Motion transmitting means connect the driver member with the speed changing member of the transmission for moving the speed changing member between its several positions when the driver member rotates backward. Motion limiting means are provided for limiting backward rotation of the driver member to a predetermined arc.

Other features and many of the attendant advantages of the invention will be readily appreciated as the same becomes better understood by reference to the following detailed description when considered in connection with the appended drawings in which like reference numerals designate like parts throughout the figures thereof, and in which.

Figure 1:
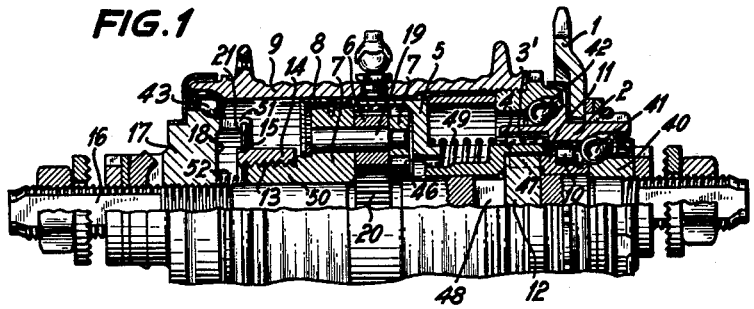
FIG. 1 shows a two-speed hub of the invention in fragmentary side elevational view, partly in section on an axial elevational plane.

Referring now to the drawing in detail, and initially to FIG. 1, there is seen the rear wheel hub of a bicycle to which the wheel rim is to be secured by a multiplicity of wire spokes, as is conventional. The working elements of the hub are mounted on a stationary shaft 16 adapted to be clamped in a fork of the bicycle frame. Most of the movable hub elements are enveloped by a hub shell 9 coaxial with the shaft 16. The shaft carries two axially spaced bearing members 17, 40 which provide inner races for ball bearings 43, 41. One axial end of the hub shell 9 forms the outer race for the bearing 43. A tubular driver member 2 fixedly fastened to the drive sprocket 1 of the hub rotates on the ball bearing 41 and rotatably supports the other axial end of the hub shell 9 by means of an interposed ball bearing 42.

For convenience of description, this other axial end of the hub shell 9 and the corresponding end of the shaft 16 and of other hub elements will be referred to hereinafter as the respective "drive" ends of the hub, shaft, etc. The axial end portion of the driver member 2 remote from the drive end, has internal axially elongated teeth 3 which mesh permanently with corresponding external teeth 3' of an axially slidable coupling sleeve 4. The sleeve transmits the rotary motion of the driver member to a variable-speed transmission, and its external teeth may be considered the input means of the transmission.

In the embodiment of the invention illustrated, the transmission includes two-speed planetary gearing which consists of a sun wheel 20 coaxially fixed on the shaft 16, a planet carrier 7 rotatable on the shaft and carrying three planet wheels 6 on respective shafts 19, and a ring gear 5. The planet wheels, of which only one is visible in the drawing, simultaneously mesh with the sun wheel and the ring gear, as is conventional.

Figure 2:
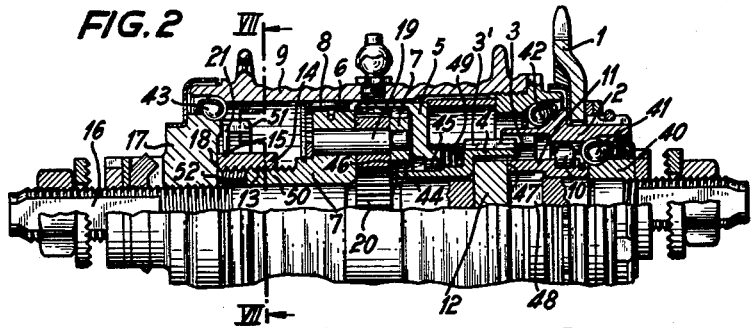
FIG. 2 shows the hub of FIG. 1 in an intermediate position during a speed change.

Internal axially elongated teeth 45, 46 on the ring gear 5 and the planet carrier 7 are alternatingly engageable with similar teeth 44 on the coupling sleeve 4 by axial movement of the latter as is apparent from consideration of FIGS. 1 and 2. A pawl coupling 8 on a face of the planet carrier 7 opposite the internal wall of the hub shell 9 is so arranged as to couple the shell to the planet carrier when the driver member 2 is rotated by forward pedaling. Such rotation of the driver member 2 will be referred to hereinafter as forward rotation. During backward rotation of the driver member, as during back-pedaling, or during standstill of the driver member 2, the hub shell 9 overrides the planet carrier 7.

In the position illustrated in FIG. 1, the planetary gearing is set for the lower one of its two speeds in which the coupling sleeve 4 engages the ring gear 5. Torque is transmitted from the non-illustrated pedals by means of a chain (not shown) to the drive sprocket 1 and driver member 2, thence by the sleeve 4 to the ring gear 5, the planet wheels 6, to the planet carrier 7 which is the ouput member of the transmission, and further by the pawl coupling 8 to the hub shell 9. The shell rotates at lower speed than the sprocket 1.

Figure 3:
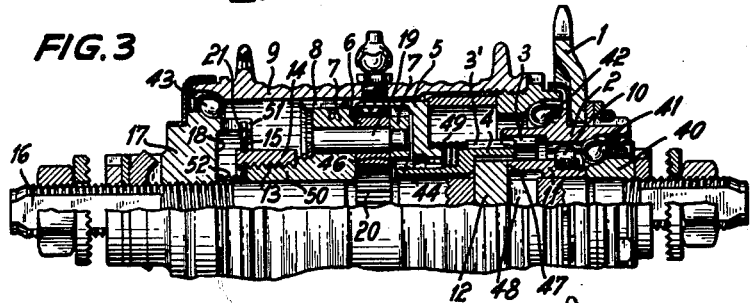
FIG. 3 shows the same hub after completion of the speed change.

FIGS. 2 and 3 show the planetary gearing arranged for its higher speed in which the teeth 44 engage the teeth 46. Torque is transmitted from the sprocket 1 and driver member 2, to the sleeve 4, the planet carrier 7, the pawl coupling 8, and to the hub shell 9 which rotates at the same speed as the sprocket 1.

The mechanism shifting the coupling sleeve 4 between its axial positions of engagement with the ring gear 5 and the planet carrier 7 respectively derives its movement from the driver member 2 by means of a one-way clutch 10 in which radially opposite surfaces of the driver member 2 and of a speed changing sleeve 11 define several circumferentially spaced wedge shaped spaces in which rollers are movable circumferentially toward and away from a position of simultaneous wedging engagement with the two opposite surfaces. The clutch 10 is so arranged that no torque is transmitted during forward rotation of the sprocket 1, but that the sleeve 11 is coupled to the driver member 2 during back-pedaling. The drive end of sleeve 11 is rotatable on the shaft 16.

The other axial end of the speed changing sleeve 11 has an enlarged bore and a cam face 47 which cooperates with a sliding block 12 in a manner known per se. The block is axially guided and secured against rotation in a slot 48 of the shaft 16. The block 12 is held in abutting engagement with an internal shoulder of the coupling sleeve 4 by a helical compression spring 49 which is interposed between the coupling sleeve 4 and a radial face of the ring gear 5. The spring 49 thus also urges a contact face of the block 12 into abutting engagement with the cam face 47 of the speed changing sleeve 11. Rotation of the sleeve 11 during backward rotation of the driver member 2 causes axial reciprocating movement of the block 12 between the two positions illustrated in FIGS. 1 and 2 respectively. The coupling sleeve 4 moves with the block 12 between respective positions of engagement with the ring gear 5 and the planet carrier 7.

The structure described so far would permit unlimited continuous back-pedaling and corresponding continuous switching of the planetary gear transmission from low to high speed and back. Multiple speed hubs operating in such a manner are known, and it is the primary object of this invention to prevent more than one speed change at any one time.

Figure 7:
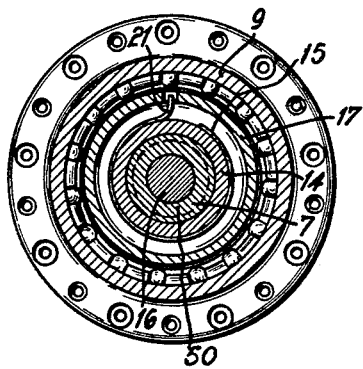
FIG. 7 shows the hub of FIGS. 1 to 3 in radial section on the line VII—VII in FIG. 2.

For this purpose, the planet carrier 7 is provided with an integral tubular hub 50 which extends from the planet carrier 7 in an axial direction away from the drive end. A flat external thread 13 on the hub 50 engages a corresponding internal thread on a coaxial abutment tube 14. A leaf spring 15 is bent into a single open circular turn about the tube 14 as best seen in FIG. 7. One end 21 of the spring extends radially outward from the arcuately bent remainder of the spring into a slot of a tubular coaxial portion 51 of the bearing member 17 which projects from a radial face 18 of the latter toward the drive end of the multiple-speed hub. The spring 15 which abuts against a wall in the slot frictionally engages the cylindrical outer surface of the tube 14, and restrains its rotation on the threads 13. A strong helical spring 52 interposed between the face 18 of the abutment bearing member 17 and a radial end face of the hub 50 moves the planet carrier 7 into axial abutment against the sun wheel 20.

During back-pedaling, the planet carrier 7 and its integral hub 50 rotate in a corresponding direction regardless of the speed ratio for which the transmission is set. Back-pedaling, or the corresponding backward rotation of the driver member 2, rotate the hub 50 in such a direction that the tube 14, which cannot rotate with the hub 50 because of the spring 15, moves axially away from the drive end of the hub 50. Eventually, the tube 14 abuts against the radial face 18 and further back-pedaling is prevented by the frictional drag of the spring 15 on the tube 14 as amplified by the threads 13.

The pitch of the threads 13 is coordinated with the shape of the cam face 47 in such a manner that the axial movement of the tube 14 from the position illustrated in FIG. 1 to the position shown in FIG. 2 is completed during an angular movement of the driver member 2 only slightly greater than that needed for the speed change by means of the clutch 10 and speed changing sleeve 11.

When after speed change, forward rotation of the driver member 2 is resumed, the tube 14 returns to its original position on the drive end of the threads 13. The spring 15 is coiled on the tube 14 in such a direction that it will tend to be tightened by friction with the tube when the latter moves away from the drive end of the bicycle hub, and will be loosened by movement toward the drive end. When the tube 14 during its threaded movement toward the drive end of the shaft 16 reaches a position of abutment against a radial face of the planet carrier 7 as shown in FIG. 3, the grip of the spring 15 on the tube 14 is sufficiently loosened to permit unimpeded forward rotation of the drive member 2. From the position of FIG. 3, a speed change to the lower speed of FIG. 1 is again possible by simple back-pedaling until abutment of the tube 14 against the face 18 of the bearing member 17 makes further back-pedaling difficult or impossible.

The invention is not limited to any specific variable-speed transmission arrangement, and may be modified to provide other means for limiting backward movement of a driver member without departing from the scope and spirit of this invention.

Figure 4:
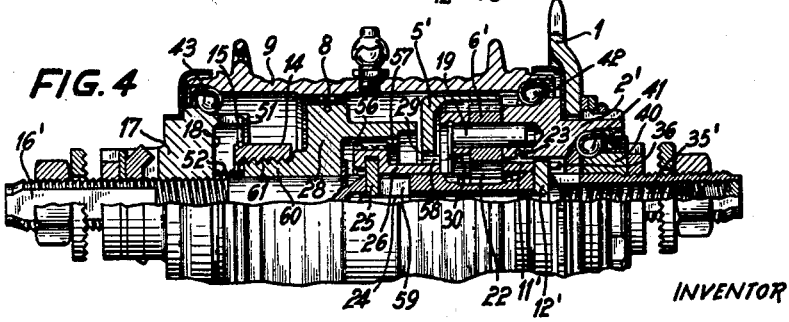
FIG. 4 illustrates a second embodiment of the invention in a view corresponding to those of FIGS. 1 to 3.

FIG. 4 shows an embodiment of the invention which differs from that illustrated in FIGS. 1 to 3 mainly in the transmission arrangement. Those elements of the bicycle hub of FIG. 4 which are the same as those of the aforedescribed hub are provided with identical reference numerals.

The stationary shaft 16' carries bearing members 17, 40. A ball bearing 41 on the member 40 supports a driver member 2' integral with a drive sprocket 1. A ball bearing 42 is interposed between the driver member 2' and the hub shell 9 which is also rotatably mounted on the other axial end of the shaft 16 by a ball bearing 43 on the member 17.

The planetary gearing which provides two speed ratios between the sprocket 1 and the hub shell 9 consists of a sun gear 22, planet wheels 6' rotatable on respective shafts 19 mounted on the driver member 2' which thus assumes the functions of a plant carrier, and a ring gear 5'. A pawl carrier 28 is arranged axially adjacent the planetary gearing. It transmits its rotary movement to the hub shell 9 by means of a pawl coupling 8.

A coupling sleeve 26 is axially slidable on the shaft 16'. It has a first external rim of teeth 56 which permanently meshes with an internal toothed rim 57 on the pawl carrier 28. A second external of rim of teeth 58 on the sleeve 26 may be engaged either with internal teeth 29 on the ring gear 5' or with an internal toothed rim 30 on the driver member 2'. When the rim 58 engages the ring gear 5', the hub shell 9 rotates faster than the sprocket 1. When the rim 58 engages the internal rim 30 of the driver member 2', the sprocket 1 and the hub shell 9 rotate at the same speed.

The input means of the transmission illustrated in FIG. 4 thus is constituted by the several planet wheels 6', the output means is constituted by the pawl carrier 28, and the speed changing member is the coupling sleeve 26.

The sleeve 26 is shifted axially for changing the transmission speed by a mechanism including a sliding block 25 which is axially movable in a slot 59 of the shaft 16', and secured therein against rotation about the shaft axis. Its axial movements are actuated by a rod 24 which extends from the block 25 toward the drive end of the hub and is permanently urged away from the drive end by a helical compression spring 35' arranged in an axial bore of the shaft 16'.

The drive end of the rod 24 carries a second slide block

12' similarly guided in the shaft 16' as the block 25. The block 12' cooperates with a cam slot 36 in a speed changing sleeve 11' in the manner described above in connection with FIGS. 1 to 3 with reference to the block 12 and the speed changing sleeve 11.

Rotation of the sleeve 11' during back-pedaling is selectively actuated by a pawl clutch 23 interposed between the sleeve 11' and the driver member 2'. During its forward rotation, the driver member 2' merely overrides the pawl clutch, and the speed changing sleeve 11' stands still. Backward rotation of the driver member 2' rotates the cam slot 36 and thus causes axial movement of the rod 24 and of the transmission members coupled to the rod.

The rotary movement of the transmission and of the driver member is limited by an arrangement similar to that shown in FIGS. 1 to 3 and 7. A tubular hub 50 is integral with the pawl carrier 28 and projects therefrom in a direction away from the drive end of the shaft 16'. The hub 50 has a flat external thread 13 on which an internally threaded tube 14 is movable. A coiled spring 15 an end 21 of which engages a tubular projecting portion 51 of the bearing member 17 prevents rotary movement of the tube 14 about the axis of the shaft 16' during back-pedaling, but permits the tube 14 to rotate with the hub 50 and the pawl carrier 28 during forward rotation of the driver member 2' when in abutment against the pawl carrier 28. When the tube 14 abuts against the radial face 18 of the bearing member 17 during back-pedaling, further backward movement of the driver member 2' becomes virtually impossible. The cam slot 36 of the speed changing sleeve 11' is shaped to perform one speed changing operation, but not more, during travel of the tube 14 from the position illustrated in FIG. 4 into a position of abutment against the radial face 18.

Figure 5:
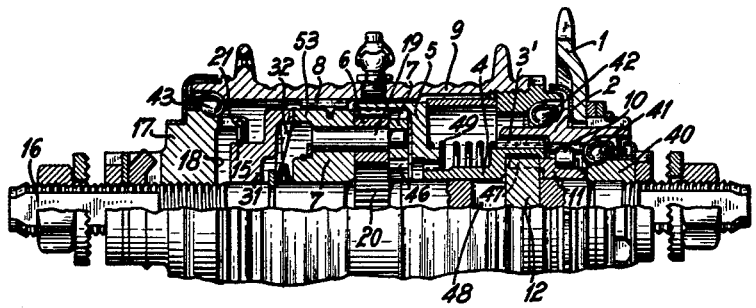
FIG. 5 shows yet another embodiment of the invention in a fragmentary elevational, partly axially sectional view.

The embodiment of the invention illustrated in FIG. 5 differs from that shown in FIGS. 1 to 3 and 7 by different means for limiting backward rotation of the sprocket 1. The planetary gearing and the motion transmitting means which cause speed change during back-pedaling are substantially identical with those described above in connection with FIGS. 1 to 3, and need no further description. The planet carrier 7 lacks an integrally attached hub 50, but cooperates with a cup shaped blocking or abutment member 31 which is rotatable and axially slidable on the stationary shaft 16. Rotation of the member 31 is impeded by a spring 15 which is coiled on an external cylindrical face of the cup shaped member 31 in the afore-described manner. The spring 15 has a radially projecting end portion 22 which engages a slot in an axially projecting portion of the bearing member 17.

The rim of the cup-shaped member 31 is formed with saw teeth 32 which have one circumferential flank that ascends gently in an axial direction, and an approximately axially descending flank. A ring 53 integrally joined to the planet carrier 7 and having the same diameter as the rim of the cup shaped member 31 has saw teeth of complementary shape. The axial flanks of the teeth on the member 31 and the ring 53 engage during forward rotation of the driver member 2, and the torque transmitted overcomes the frictional resistance of the spring 15. The grip of the spring 15 on the cup shaped member 31 is loosened during such forward rotation. During back-pedaling, the gently ascending flanks of the conforming teeth cooperate in the manner of engaged helical threads to push the cup-shaped member 31 axially away from the drive end of the shaft 16 and into abutment against the radial abutment face 18 of the bearing member 17 while the coupling sleeve 4 is shifted axially to effect a speed change. Abutment of the member 31 against the face 18 blocks further back-pedaling, and prevents the speed from being changed a second time involuntarily.

Figure 6:
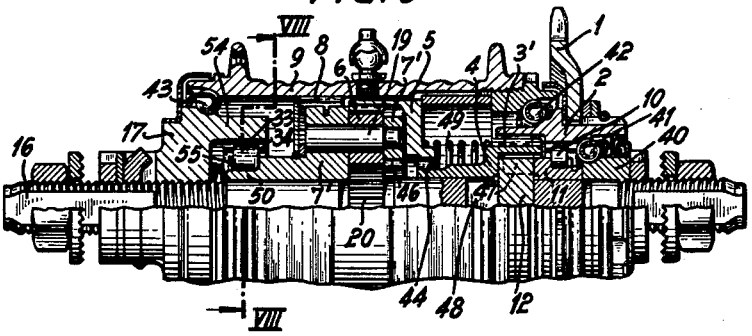
FIG. 6 is an elevational, partly sectional view of a further embodiment of the invention.
Figure 8:
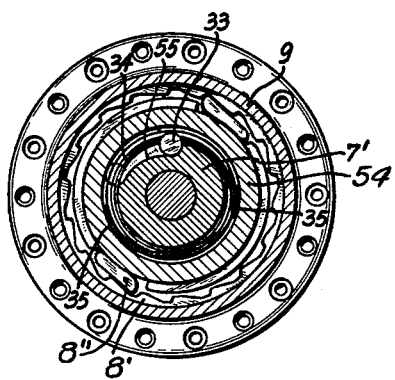
FIG. 8 shows the hub of FIG. 6 in radial section on the line VIII—VIII.

Another means for limiting the arc of rotation of the sprocket 1 during back-pedaling is illustrated in FIGS. 6 and 8 in a side-elevational, partly sectional view, and in a radially sectional front-elevational view respectively. In all other respects, the variable-speed hub illustrated in FIGS. 6 and 8 is substantially identical with that shown in FIGS. 1 to 3 and 7, and the corresponding elements which do not materially differ will not be further described.

The planet carrier 7' of the planet gearing seen in FIG. 6 is axially lengthened in a direction away from the drive end of the shaft 16, and carries a one-way clutch essentially consisting of several wedging abutment rollers 33 retained in a cage 34. For the sake of clarity, only a single roller 33 is shown in the corresponding radially sectional view of FIG. 8. The one-way clutch is arranged in an annular space between the outer face of the extension portion of the planet carrier 7' and the inner cylindrical face of an integral coaxial tubular extension member 54 on the bearing member 17.

The afore-mentioned outer face of the planet carrier 7' has radially open circumferential grooves in which the wedging rollers 33 are guided. While only one such guide groove is seen in FIG. 8, it will be understood that there are as many guide grooves 55 as there are abutment rollers 33, and preferably not fewer than two. The grooves 55 have a circumferential end portion of greatest depth. The roller 33 when received in this deepest groove portion, as shown in FIG. 8 in fully drawn lines, is held out of contact with the inner abutment face of the extension member 54 by the cage 34. Spacer springs 35 on the cage yieldably urge the cage 34 into the illustrated position.

The grooves 55 taper in depth circumferentially so that circumferential movement brings the rollers 33 into simultaneous wedging engagement with the outer face of the planet carrier 7' and the inner face of the member 54. The wedging position of the roller 33 in FIG. 8 is shown in broken lines. This position is reached during back-pedaling when the frictional engagement between the spacer springs 35 and the inner face of the member 54 moves the rollers 33 out of the deepest portions of their respective guide grooves 55. Wedging of the rollers 33 between the planet carrier 7' and the stationary member 54 makes further back-pedaling impossible. Forward rotation of the driver member 2 returns the wedging rollers 33 to the position indicated in FIG. 8 by fully drawn lines. FIG. 8 also shows the internal ratchet 8' on the hub shell 9 and the two pawls 8'' on the planet carrier 7' which constitute the pawl coupling 8. It will be understood that the length of the grooves 55 is coordinated with the shape of the cam face 47 on the speed changing sleeve 11 so that speed change is completed during travel of the wedging roller 33 between its two illustrated positions.

If it should be found that one of the several means disclosed for limiting back-pedaling interfere with manual backward movement of the bicycle by a dismounted rider, the resulting difficulties may be avoided by modifying the coupling 8. In the embodiments of the invention illustrated in FIGS. 1 to 5 and 7, the pawl coupling 8 may be interposed between the hub shell 9 and the internally threaded tube 14, and between the shell and the cup shaped member 31 respectively without materially affecting the operation of the hub. In the embodiment illustrated in FIGS. 6 and 8 the pawl coupling 8 may be replaced by a coupling employing wedging rollers as shown in FIG. 8 for connecting the hub shell 9 to the planetary gear transmission. When a bicycle so equipped is pushed backward, blocking of the transmission cannot occur.

Obviously, other modifications and variations of the present invention are possible in the light of the above teachings. It is therefore to be understood that, within the scope of the appended claims, the invention may be practiced otherwise than as specifically disclosed.

What I claim is:

1. In a multiple-speed hub for a bicycle and the like, in combination:
   (a) hub shell means having an axis;
   (b) a driver member rotatable about said axis;
   (c) actuating means for selectively actuating rotation of said driver member about said axis in a forward and in a backward direction;
   (d) variable speed transmission means including rotatable input means, rotatable output means, and a speed changing member movable between a plurality of positions for varying the speed ratio of said input and output means;
   (e) first motion transmitting means connecting said driver member with said input means for joint rotation of said transmission means with said driver member;
   (f) second motion transmitting means selectively connecting said output means with said hub shell means for joint rotation when said driver member rotates in said forward direction;
   (g) third motion transmitting means selectively connecting said driver member with said speed changing member for moving the same between said plurality of positions thereof when said driver member rotates in said backward direction; and
   (h) motion limiting means for limiting said backward rotation of said driver member to a predetermined arc.

2. In a hub as set forth in claim 1, a stationary shaft coaxial with said hub shell means, said motion limiting means including first abutment means threadedly connected to said transmission means for threaded movement in the direction of said axis when said transmission means rotates jointly with said driver member during said backward rotation of the same; and second abutment means on said shaft, said second abutment means being abuttingly engageable by said first abutment means during said threaded movement thereof.

3. In a hub as set forth in claim 2, said first and second abutment means being axially engageable during said threaded movement of said first abutment means.

4. In a hub as set forth in claim 2, means for selectively preventing rotation of said first abutment means relative to said shaft during said threaded movement thereof.

5. In a hub as set forth in claim 2, said transmission means including a plurality of meshingly engageable rotatable transmission members including said speed changing member, respective ones of said transmission members constituting said input means and said output means, said first abutment means threadedly engaging one of said transmission members, and means for selectively preventing rotation of said first abutment means with the one threadedly engaged transmission member during said backward rotation of said driver member.

6. In a hub as set forth in claim 5, engaged threads on said one transmission member and on said first abutment means respectively.

7. In a hub as set forth in claim 5, engaged axially projecting helical saw tooth means on said one transmission member and on said first abutment means respectively, said saw tooth means constituting a threaded connection between said one transmission member and said first abutment means.

8. In a hub as set forth in claim 1, a stationary shaft coaxial with said hub shell, said motion limiting means including means interposed between said transmission means and said shaft for selectively engaging said transmission means with said shaft after rotation of said transmission means relative to said shaft through a predetermined arc during backward rotation of said driver member.

9. In a hub as set forth in claim 1, said third motion transmitting means including one-way clutch means, a rotary member connected to said one-way clutch means for joint rotation with said driver member when the same rotates in said backward direction, said speed changing member being axially movable between said plurality of positions thereof, and cam means interposed between said rotary member and said speed changing member for axially moving said speed changing member when said rotary member rotates.

References Cited by the Examiner

UNITED STATES PATENTS

| 942,220 | 12/09 | Rockwell. |
| 942,520 | 12/09 | Rockwell. |

FOREIGN PATENTS

| 1,037,891 | 8/58 | Germany. |

DON A. WAITE, *Primary Examiner.*